United States Patent Office 3,420,354
Patented Jan. 7, 1969

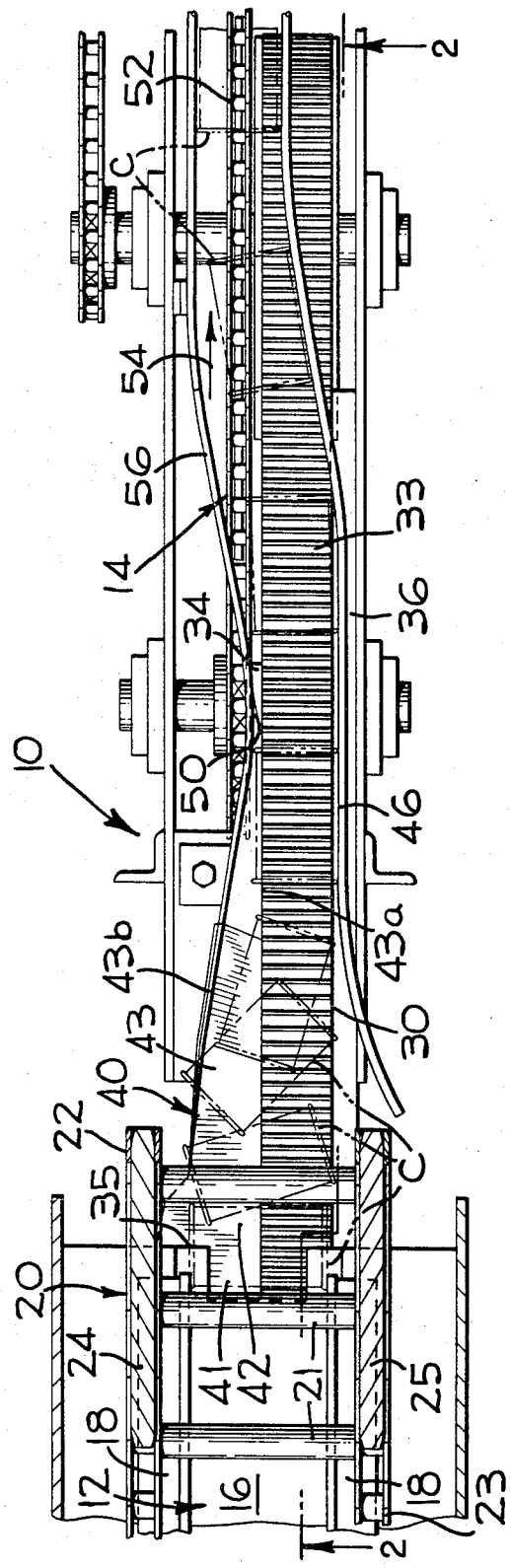
FIG_1

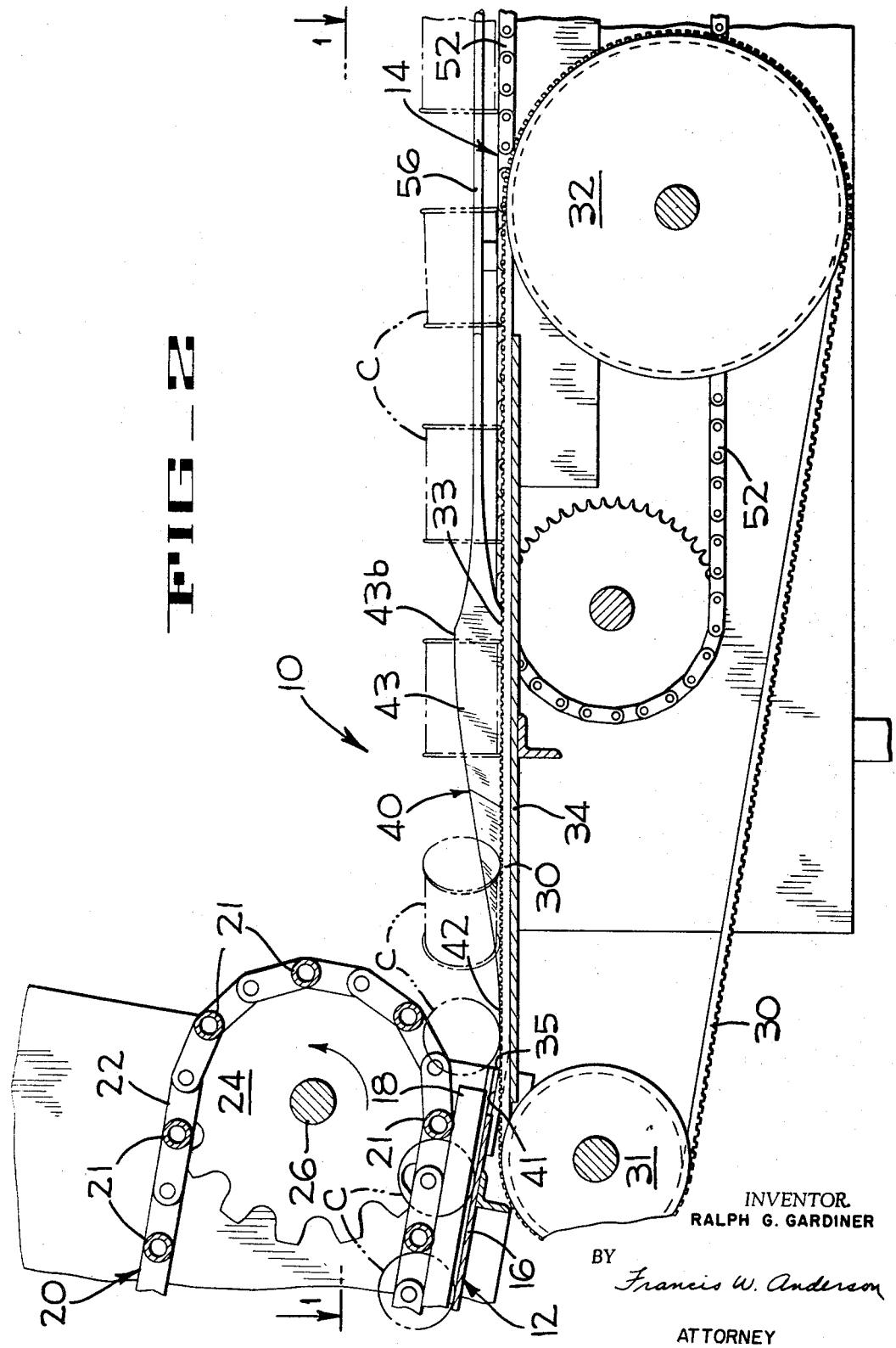

3,420,354
CONTAINER ORIENTING APPARATUS
Ralph G. Gardiner, Los Gatos, Calif., assignor to FMC Corporation, San Jose, Calif., a corporation of Delaware
Filed Jan. 5, 1967, Ser. No. 607,453
U.S. Cl. 198—33
Int. Cl. B65g 47/24
1 Claim

ABSTRACT OF THE DISCLOSURE

A chain advances cans one at a time with the longitudinal axis of each can disposed transversely to its direction of movement. Each can is discharged from the chain feeder in a broadside manner so that the chime at one end of the can rolls onto a dead plate while the chime at the other end rolls onto a rapidly moving rubber belt which grips this chime and pulls that end of the container forwardly while the other end is retarded by the dead plate. The dead plate has a twisted configuration adapted to guide the trailing end of the container into position behind the accelerated leading end and thus complete the re-orientation of the can.

Background of the invention

In general this invention relates to the field of art concerned with the movement of articles on conveyors, and more particularly concerns mechanisms for rotating articles through substantially 90° as they are moved along a conveyor. The patent to Stevenson No. 2,815,846 discloses a pin which is arranged to be projected upwardly into the path of articles at one side of the path so that the articles will contact the pin and swing around the pin to a new orientation due to the continued movement of the conveyor on which the articles are advancing. The patent to Bruce No. 2,633,251 discloses a vertically movable turntable that is raised up from beneath a stationary article to lift the article from a conveyor surface, rotate it 90°, and lower it back onto the conveyor surface. Each of these mechanisms has had a measure of success for handling particular articles but neither is adapted for handling cans that are moving at speeds of about 450 cans per minute since the turn pin will cause denting of fast moving cans and the turntable is altogether too slow in operation.

It is therefore an object of the present invention to provide a can orienting mechanism capable of turning cans through substantially 90° while they are moving rapidly and without damage to the cans.

Summary of invention

The container orienting mechanism of the present invention comprises a stationary plate and a moving rubber belt disposed side-by-side adjacent the discharge end of a feed mechanism which discharges cylindrical containers one at a time with the longitudinal axis of each container oriented transversely to the direction of movement of the container. As a container is discharged the chime at one end of the container rolls onto the stationary plate while the chime at the other end rolls onto the rubber belt which grips it and accelerates it, causing that end of the container to move forward relative to the other end. The stationary plate is twisted and curved toward the rubber belt so that it guides the trailing end of the container into position behind the leading, accelerated end.

Description of the drawings

FIGURE 1 is a schematic plan of the can turning mechanism of the present invention, with a portion of the mechanism shown at a section taken along line 1—1 of FIG. 2.

FIGURE 2 is a section taken on line 2—2 of FIG. 1.

In the embodiment of the invention chosen for illustration in FIGURES 1 and 2, the can turning mechanism 10 is arranged to receive cans from an inclined chute 12, turn them 90 degrees, and deliver them in end-to-end arrangement to a receiving conveyor 14.

The cans C roll by gravity down the inclined floor 16 of the chute 12, being guided at opposite sides of the floor by two spaced stationary angle brackets 18. The cans are discharged from the chute 12 in spaced relation under the control of a timing chain 20 which includes spaced transverse rods 21 connected between two chains 22 and 23 trained around a pair of drive sprockets 24 and 25, that are keyed to a counterclockwise rotating shaft 26, and around a similar pair of idler sprockets (not shown) that support the upper ends of the chains. As readily seen in FIG. 2, the cans are released in spaced relation by the lower run of the timing chain at intervals such that a leading can may be turned without being interfered with by the following can.

The can turner comprises an endless rubber belt 30 that is trained around an idler pulley 31 and a drive pulley 32 and has an upper run 33 that rides on a flat support plate 34 and passes closely beneath the lower edge 35 of the floor 16 of the chute 12. The belt has a grooved or corrugated surface with grooves about ⅛" deep and ¼" wide, is about 2" wide, and has a side edge abutting a flat guide strap 36 fixed on the upper surface of plate 34 alongside the belt. The belt is so positioned relative to the path of cans being discharged from the chute that only one end chime of the can will roll onto the belt. The other chime of the can will roll onto a dead plate 40 that is disposed alongside the belt and has a generally flat portion 41 (FIG. 2) underlying the lower end of the floor, and a flat portion 42 (FIG. 1) that is in substantially the same horizontal plane as the upper run of belt 30. The plate 40 is made of rigid material having a "Teflon" (polytetrafluoroethylene) surface coating. On the downstream side of portion 42 the dead plate has a twisted portion 43 whose inner edge 43a is disposed close to and is in substantially the same plane as the adjacent edge of the upper run of the belt 30. The outer edge 43b of the twisted portion 43 is inclined upwardly and inwardly toward a position overlying the inner edge 43a so that a progressively restricted channel is formed between the inclined portion of the dead plate 40 and an upright stationary side wall 46 which is mounted in fixed position adjacent the edge of the belt 30. At its narrowest portion, the channel provides a throat portion 50 and, on the downstream side of the throat, the channel bends outwardly until it overlies the upper run of the endless chain discharge conveyor 14 that is moving in the direction of arrow 54.

Referring to FIGURE 1 it will be seen that a can C, released by the timing chain 20 at a predetermined forward linear speed, rolls substantially simultaneously onto the belt 30 and onto the portion 42 of the dead plate. The upper run of the belt is moving at a speed that is faster than the speed of the entering can. Accordingly, the portion of the can that contacts the belt is given a forward acceleration due to the gripping of the can by the corrugated or fluted surface of the rubber belt. As a result, the portion of the can in engagement with the belt is pulled ahead of the other end of the can, thus starting the turning movement of the can. The turning effect on one end of the can is increased as that end starts to ride up the upwardly inclined twisted portion 43 of the dead plate. Also, the upwardly slanted portion of the plate guides the trailing end of the can inwardly toward the belt so that, by the time the can reaches the throat 50 it is moving lengthwise. When the can passes through the throat 50 it is guided away from the belt 30 and to a position on the upper run of the chain 52 which conveys the can in the direction of arrow 54 between the wall 46 and a similar stationary guide wall 56.

The container orienting apparatus of the present invention is particularly effective for handling containers moving at high speeds. In one successful installation, containers, which were about 2 11/16 inches in diameter and 4 inches long and filled with water, were handled at a rate of about 450 cans per minute. These cans were successfully oriented with the rubber belt 30 moving at a linear velocity of about 188 feet per minute.

Having thus described the invention, what I claim as new and desire to protect by Letters Patent is:

1. Container orienting mechanism comprising an endless belt having a horizontal surface adapted for gripping the chimes of cylindrical containers, a receiving conveyor disposed adjacent one side of said endless belt and having an upper surface disposed slightly above the horizontal plane of said endless belt, a stationary plate disposed adjacent one end of said belt and extending part way along said belt, one end portion of said plate and the adjacent end portion of said belt lying in a common horizontal plane and defining a container-receiving zone, said stationary plate having one longitudinal edge lying in said common horizontal plane immediately adjacent one side of said endless belt and another edge inclined upwardly from said horizontal plane at said one end and terminating in a substantially vertical position above said one longitudinal edge downstream of said container-receiving zone, means for moving the containers at a predetermined speed of about 450 containers per minute onto the end portions of said belt and said plate at said zone with the chime at one end of each container being in contact with the plate and the chime at the other end resting on the end of said belt, means for moving said belt and said receiving conveyor at a linear speed that is greater than said predetermined speed whereby the end of each container having its chime in engagement with said belt will be accelerated away from said zone at a greater speed than the other end of the container, and said other end of the container will roll down the inclined portion of said stationary plate onto said belt causing the container to pivot about an axis normal to its longitudinal axis and advance in the direction of its longitudinal axis, said belt speed being about 188 feet per minute, and guide rails spaced apart a distance only slightly larger than the diameter of the containers and extending downstream of said plate, one of said guide rails being angled over said endless belt for slidably engaging the containers and rolling the containers transversely off said endless belt and onto said receiving conveyor while moving the containers at a rate in excess of about 450 containers per minute.

References Cited

UNITED STATES PATENTS

| | | | |
|---|---|---|---|
| 2,707,924 | 5/1955 | Hansen | 198—33 X |
| 2,925,165 | 2/1960 | Rake | 198—198 |
| 3,063,542 | 11/1962 | Boller | 198—33 |
| 3,269,513 | 8/1966 | Del Rosso | 198—33 |
| 3,306,424 | 2/1967 | Fahrenbach | 198—33 |
| 3,323,633 | 6/1967 | Engel et al. | 198—33 |

EVON C. BLUNK, *Primary Examiner.*

M. L. AJEMAN, *Assistant Examiner.*

U.S. Cl. X.R.

198—34